United States Patent
McFadden et al.

[11] Patent Number: 6,138,554
[45] Date of Patent: Oct. 31, 2000

[54] MULTI-LAYER GRIDDLE

[75] Inventors: David H. McFadden, Lexington, Mass.; James T. Cole, Algonquin, Ill.; Stephen A. Mariano, Watertown; David L. Richardson, Lexington, both of Mass.

[73] Assignee: Gas Research Institute, Chicago, Ill.

[21] Appl. No.: 09/267,564

[22] Filed: Mar. 12, 1999

[51] Int. Cl.[7] .............................. A47J 37/10; H05B 3/00
[52] U.S. Cl. .............................. 99/422; 99/447; 219/462
[58] Field of Search ..................... 99/422, 447; 219/443, 219/462, 542; 126/395

[56] References Cited

U.S. PATENT DOCUMENTS

| | | | |
|---|---|---|---|
| 5,134,265 | 7/1992 | Dickens et al. | |
| 5,227,597 | 7/1993 | Dickens et al. | |
| 5,413,032 | 5/1995 | Bruno et al. | 99/331 |
| 5,467,695 | 11/1995 | Keller et al. | 99/422 |
| 5,619,910 | 4/1997 | Farnsworth et al. | 99/422 |
| 5,676,043 | 10/1997 | Best | 99/331 |

FOREIGN PATENT DOCUMENTS 0197905  10/1986  European Pat. Off. .................. 99/422

*Primary Examiner*—Reginald L. Alexander
*Attorney, Agent, or Firm*—Pauley Petersen Kinne & Fejer

[57] ABSTRACT

An apparatus for cooking food having a multi-layer cooking plate including a stainless steel sheet layer having a top surface and a bottom surface and a high thermal conductivity material layer metallurgically bonded to the bottom surface of the stainless steel sheet layer so as to provide intimate contact between the entire bottom surface of the stainless steel sheet layer and the high thermal conductivity material layer. Heat to the multi-layer cooking plate is provided by a fuel-fired burner disposed beneath the multi-layer cooking plate.

18 Claims, 3 Drawing Sheets

MULTI-LAYER GRIDDLE

BACKGROUND OF THE INVENTION

1. Field of the Invention

This invention relates generally to a fuel fired apparatus for cooking food and, more particularly, to a griddle system for use in commercial food services.

2. Description of Prior Art

Griddles are major cooking appliances in commercial kitchens, particularly fast food and full-service chain restaurants. Typically, such griddles consist of a large flat steel plate which is heated from below by a heating element, either fuel fired or electric, and typically employ one heating element, one thermocouple and one thermostat per linear foot which results in wide temperature variations between heating elements. The plate size usually ranges from two feet deep by two to six feet long by ¾ to one inch in thickness. The massive steel plate (griddle plate) and heating system have evolved such that the griddle plate creates a hard flat surface for cooking as well as storing a significant amount of heat that can be transferred to the food product during the initial phase of cooking, and the burner or heating system provides sufficient heat to the griddle to recover temperature during the cooking cycle.

Although in use for many years, conventional griddle designs have many disadvantages including poor plate temperature distribution due to low thermal conductivity of the steel plate. Such griddles typically have a 70° F. temperature variation across their surfaces and are unable to deliver heat to specific incremental areas. As a result, applying heat to cold areas further overheats hot areas, or vice-versa. In addition, due to the large mass of the plate, heat-up time from the point of turn-on is lengthy and response time of the plate to a cooking load is poor. Finally, recovery time of the plate between cooking loads or when the food product is turned over is also poor.

For the equipment operator, conventional griddle designs give rise to a number of issues including cooking safety due to non-uniform cooking surface temperatures, reduced cooking capacity due to the fact that a large border (about a three-inch strip) area is not at cooking temperature, reduced cooking capacity due to the time lag to diffuse the heat through the plate after a load is cooked and after a food product is turned from top to bottom, high operating costs due to the long idle periods and low capacity, low efficiency due to the heating element/plate design, and increased floor space due to low griddle surface capacity.

Several companies have introduced newer griddle products that address some of these issues. Griddles with infrared gas combustion systems are beneficial in promoting uniform temperature across the entire area of the griddle plate. U.S. Pat. No. 5,227,597 to Dickens et al. teaches a griddle employing magnetically permeable, tri-clad griddle plates heated by induction coils to their Curie temperature resulting in griddle plates which are quickly heated to a uniform, essentially constant temperature across their surfaces. See also U.S. Pat. No. 5,134,265 to Dickens et al.

In an attempt to address some of these issues, griddle plates in which the stainless steel plate is mechanically, for example, bolted, connected to a thick aluminum plate have been developed. The mechanical clad design helps in temperature uniformity, but it suffers from a thermal standpoint given the contact resistance between the plates, and it still retains significant response issues associated with the large thick aluminum plate. In addition, the manufacturing of such composite plates with numerous bolted connections is time consuming. U.S. Pat. No. 5,413,032 to Bruno et al. teaches a multi-zone griddle which is modularly constructed and load sensitive which includes a steel griddle plate ⅜" thick with upper and lower surfaces that are ground flat and, in intimate contact with the lower surface thereof, a heat spreader in the form of an aluminum plate which is about ⅛" thick. Aluminum is selected because it is soft relative to the hardness of the steel griddle plate and is given to cold flow so that soon after it is installed, the upper aluminum surface adopts to the shape of the bottom of the steel griddle plate, filling in surface valleys and giving way to surface hills.

U.S. Pat. No. 5,676,043 teaches a griddle plate made of a thin, relatively low conductivity metal and received along its bottom surface substantially thick, juxtaposed heat transfer blocks disposed in spaced relationship, side-by-side, beneath and laminated to discrete portions of the griddle plate. The upper relatively low conductivity metal plate is stainless steel and the lower discrete blocks or plates are aluminum. The plates are bonded together with a thin silicone material which is said to improve the heat distribution within the lower block because the bond causes a small resistance to the heat flow and forces the improved distribution of the energy. One of the problems associated with mechanical attachment between the stainless steel griddle plate and the lower aluminum plate is that mechanical attachment does not insure integral contact between the two plates due to oxidation or breakdown of the thermal bonding material which can form between the plates and local warping which causes small gaps to occur between the plates.

In addition to providing a good cooking surface relative to thermal distribution, a griddle plate must stay flat. Due to the use of dissimilar materials in multi-layered griddle plates, thermal distortion, that is, bending resulting from different coefficients of thermal expansion of the different material layers, can be a problem.

SUMMARY OF THE INVENTION

Accordingly, it is one object of this invention to provide a griddle having uniform plate temperature distribution.

It is another object of this invention to provide a griddle having a rapid response time to a cooking load.

It is yet another object of this invention to provide a griddle having a griddle plate with a short recovery time between loads or when the food product is turned over.

It is yet another object of this invention to provide a griddle having a griddle plate which overcomes the problems associated with multi-layer griddle plates in which the layers are mechanically secured to one another.

It is yet another object of this invention to provide a griddle having a multi-layer griddle plate which overcomes the problems associated with differences in the material properties of the different material layers.

These and other objects of this invention are achieved by an apparatus for cooking food comprising a multi-layer cooking plate comprising a stainless steel sheet layer having a top surface and a bottom surface, and a high thermal conductivity material layer metallurgically bonded to the bottom surface of the stainless steel layer so as to provide full contact between the bottom surface of the stainless steel sheet layer and the high thermal conductivity material layer, and a fuel-fired burner or other standard means of heating a griddle disposed beneath the multi-layer cooking plate. In accordance with one preferred embodiment of this invention, the cooking plate has a plate thickness in the range of about 0.165 to about 0.380 inches and the stainless steel sheet layer has a layer thickness in the range of about 0.015 to about 0.030 inches. Metallurgical bonding is preferably performed by roll-bonding, brazing, or soldering of the high thermal conductivity material layer to the stainless steel sheet layer.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
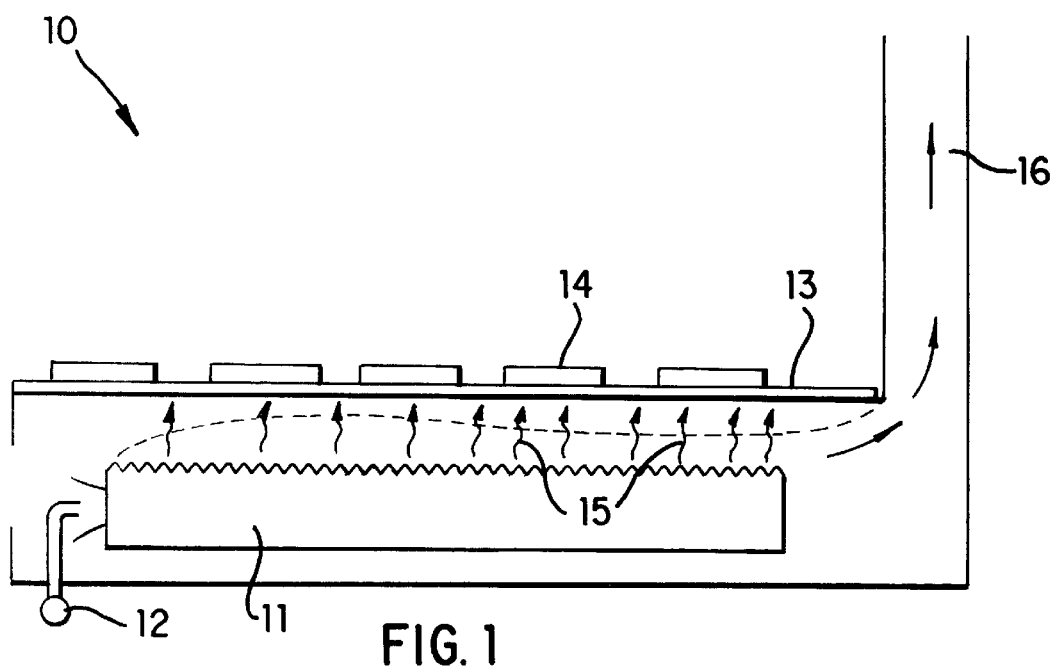
FIG. 1 is a schematic diagram of a side view of a fuel-fired cooking system employing a griddle plate in accordance with one embodiment of this invention.

FIG. 1 is a schematic side view of a griddle/cooking apparatus 10 comprising fuel-fired burner 11 in the form of at least one infrared burner, which infrared burner is the source of convective and radiative heat transfer to griddle plate 13 as symbolized by arrows 15. Fuel, preferably in the form of natural gas, is input through burner fuel supply 12 into infrared burner 11. Products of combustion generated by infrared burner 11 are exhausted through flue 16. In accordance with this design, heat is transferred from infrared burner 11 through griddle plate 13 and into cooking load 14.

Figure 2:
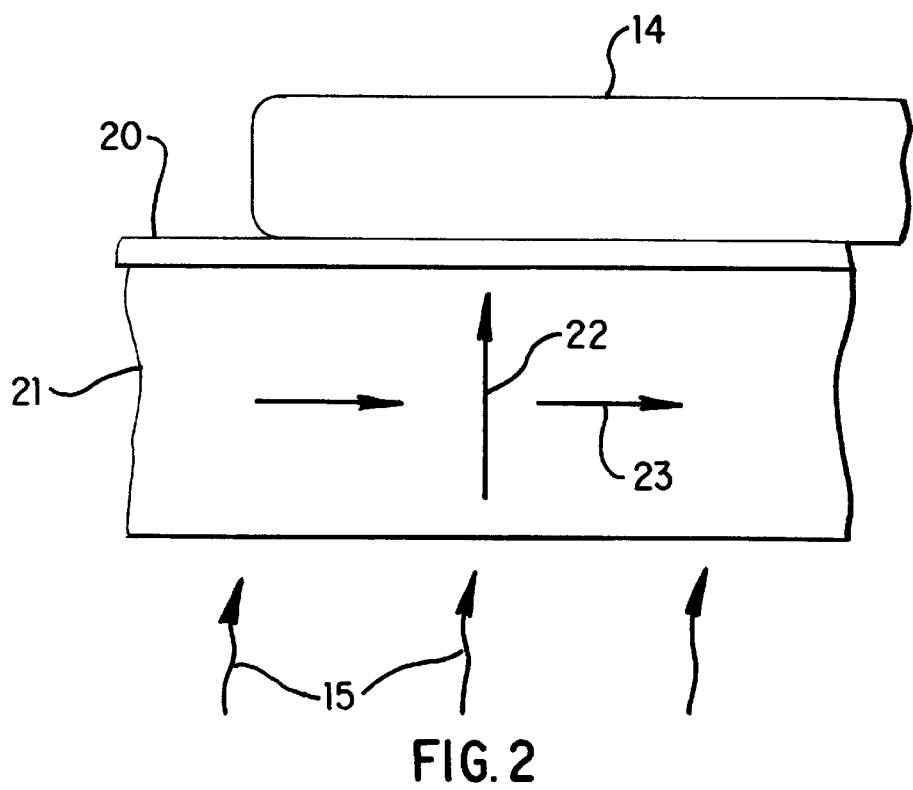
FIG. 2 is a schematic side view of a portion of a griddle plate in accordance with one embodiment of this invention showing the manner of thermal conductivity distribution throughout the plate.
Figure 7:
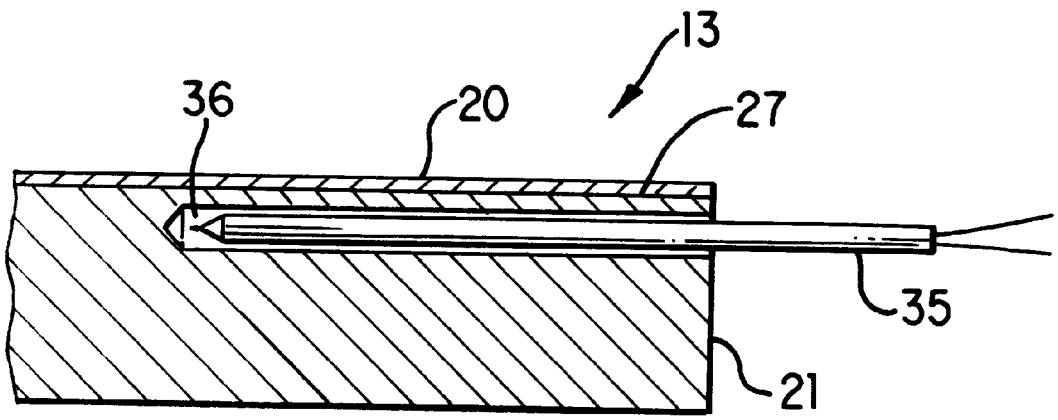
FIG. 7 is a cross-sectional view of a griddle plate for a cooking apparatus with a temperature sensor in accordance with one embodiment of this invention.
Figure 8:
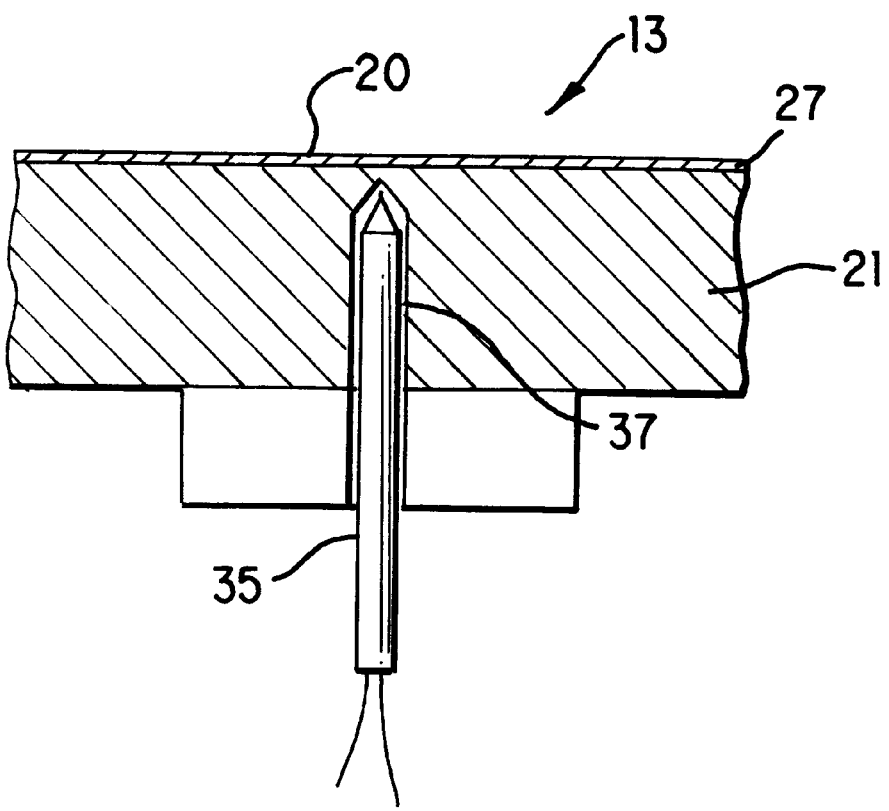
FIG. 8 is a cross-sectional view of a portion of a griddle plate with a temperature sensor for a cooking apparatus in accordance with another embodiment of this invention.

In contrast to conventional griddle systems for cooking food, the cooking apparatus of this invention comprises a thin clad griddle plate 13, as shown in FIG. 2 comprising a thin stainless steel sheet layer 20 metallurgically bonded to a thicker high thermal conductivity material layer 21, infrared burners 11, as shown in FIG. 1, that provide radiant and convective heat transfer to griddle plate 13, and a heat input control in the form of temperature control sensor element 35 shown in FIGS. 7 and 8. Thus, the cooking apparatus of this invention employs a lighter weight high thermal conductivity plate as the primary means of transferring burner output to the cooking load/food product. Griddle plate 13 has excellent thermal conductivity permitting very good transfers and through thickness heat transfer as indicated by arrows 22 and 23, respectively, in FIG. 2, thereby producing a very uniform cooking surface. In addition, this design permits the entire top surface of griddle plate 13 to be available for cooking, that is, edge-to-edge cooking, and the lighter griddle plate 13 permits very rapid heat-up and very rapid response to loads. Data that we have collected on a cooking apparatus employing a griddle plate in accordance with one embodiment of this invention showed that less than five minutes is required to bring the griddle plate of this invention up to temperature and no recovery time was required between loads. Based on our analyses and experiments, the clad griddle plate of this invention has a total thickness in the range of about 0.165 to about 0.410 inches with the thickness of the stainless steel sheet layer being in the range of about 0.015 to about 0.060 inches and the thickness of the high thermal conductivity material layer metallurgically bonded to the underside of the stainless steel sheet layer being in the range of about 0.150 to about 0.350 inches thick.

The thickness of the stainless steel sheet layer is driven by the requirement of a hard durable surface for cooking and scraping which, at the same time, does not offer much resistance to heat transfer. The high thermal conductivity material plate metallurgically bonded to the underside of the stainless steel sheet layer provides enough cross section for the needed transverse heat transfer. Material choices for the high thermal conductivity material layer are preferably selected from the group consisting of aluminum, aluminum alloys, copper, and copper alloys. Based upon the higher thermal conductivity of copper as shown in Table 1 hereinbelow, thinner plate designs may be employed.

TABLE 1

Thermal Conductivity

| Material | Thermal Conductivity (Btu/hr-ft-° F.) |
|---|---|
| Aluminum (1100) | 128 |
| Copper (commercially pure) | 207 |
| Stainless Steel (302, 303) | 11 |
| Low Carbon Steel (1020) | 30 |

As previously indicated, one of the critical elements of this invention is the requirement for a metallurgical bond between the thin stainless steel sheet layer and the high thermal conductivity material layer to insure the integral contact of the two material layers which is essential for enhanced heat transfer. Conventional non-metallurgical bond interfaces as taught by U.S. Pat. No. 5,676,043 to Best which teaches a multi-layer griddle plate employing an adhesive thermal barrier disposed between the layers, and U.S. Pat. No. 5,413,032 to Bruno et al. which relies upon the relative softness of the high thermal conductivity aluminum plate to adopt the shape of the bottom of the steel griddle plate of a multi-layer griddle plate cannot insure the integral contact required between plates due to localized warping and other events which can cause small gaps to occur between plates. Accordingly, the cooking apparatus of this invention comprises a multi-layer griddle plate in which the stainless steel sheet layer is metallurgically bonded to the high thermal conductivity material layer by roll-bonding, brazing or soldering, resulting in the formation of metallurgical bond 27 as shown in FIGS. 3–8.

In addition to providing a good cooking surface relative to thermal distribution, a griddle plate must also stay flat. Due to the fact that the multi-layer (clad) griddle plate of this invention employs a metal construction comprising dissimilar materials, material selection and/or griddle plate structure must be configured to minimize thermal distortion, that is, bending resulting from different coefficients of thermal expansion. In accordance with one embodiment of this invention, the multi-layer griddle plate is maintained in a flat state by using plate materials having matching thermal expansion coefficients. Accordingly, in accordance with one preferred embodiment of this invention employing a two-layer griddle plate design, namely a stainless steel sheet layer and a high thermal conductivity material layer, the high thermal conductivity material layer is made of copper metal and the stainless steel sheet layer is a 300 Series stainless steel.

Figure 5:
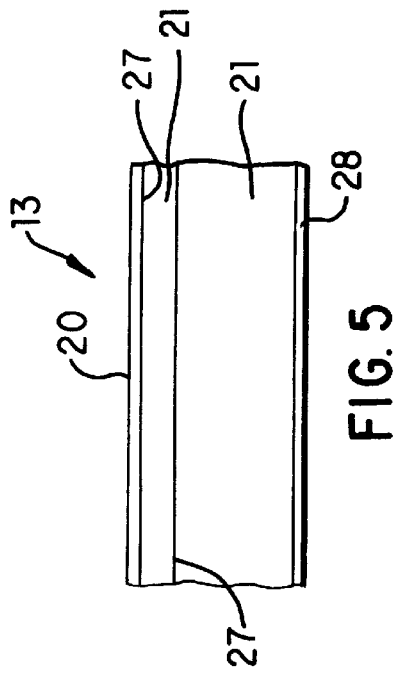
FIG. 5 is a cross-sectional side view of a griddle plate for a cooking apparatus in accordance with one embodiment of this invention.
Figure 4:
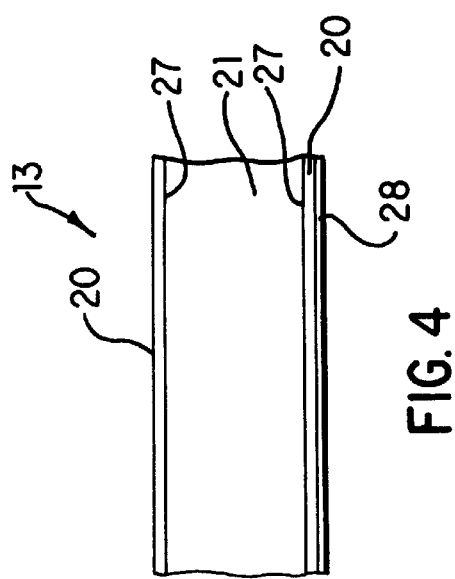
FIG. 4 is a schematic side view of a griddle plate for a cooking apparatus in accordance with another embodiment of this invention.

In accordance with one preferred embodiment as shown in FIG. 4, griddle plate 13 employs a three-layer approach in order to balance the thermal stresses between the materials of the layers. In accordance with a particularly preferred embodiment, the top and bottom layers 20 are stainless steel sheet layers and the high thermal conductivity material layer 21 disposed between the stainless steel sheet layers 20 is copper or aluminum. Whereas copper and 300 Series stainless steel have very similar coefficients of expansion, thereby permitting a griddle plate comprised of only a stainless steel sheet layer and a high thermal conductivity copper layer, the use of aluminum as the high thermal conductivity material layer 21 would require a bottom layer of thin stainless steel sheet to balance the stresses as shown in FIG. 4. In accordance with one preferred embodiment as shown in FIG. 5, griddle plate 13 is a three-layer design comprising a top stainless steel sheet layer 20, a middle high thermal conductivity copper layer 21 and a bottom high thermal conductivity copper layer.

Essential to the operation of the cooking apparatus of this invention is the providing of uniform heat transfer to griddle plate 13. In particular, a burner system that provides uniform flux over at least 40–60% of the bottom surface of griddle plate 13 is needed for good operation. In accordance with a particularly preferred embodiment of this invention, burner 11 is an infrared burner.

To further improve the performance of griddle plate 13, the bottom surface of griddle plate 13 facing infrared burner 11 is enhanced for improved heat transfer by application of a high emittance surface 28. In accordance with a particularly preferred embodiment of this invention, the high emittance surface 28 is formed by application of a high emissivity coating such as paint or chemical treatment to the bottom surface of griddle plate 13, resulting in a 5–10% improvement in efficiency.

Figure 6:
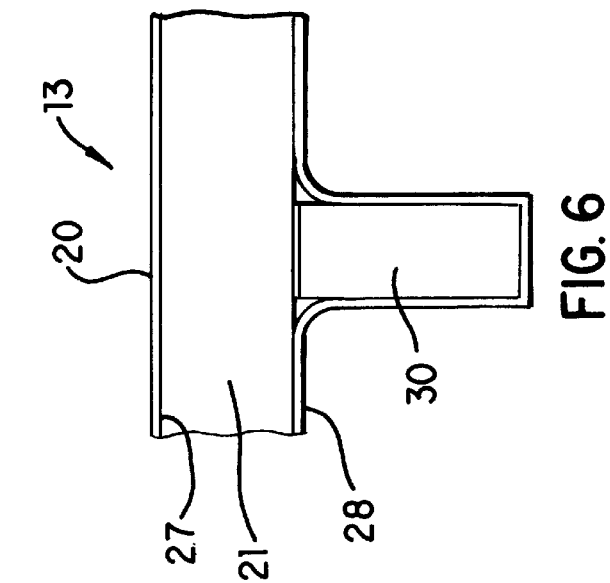
FIG. 6 is a cross-sectional side view of a griddle plate for a cooking apparatus in accordance with one embodiment of this invention.
Figure 3:
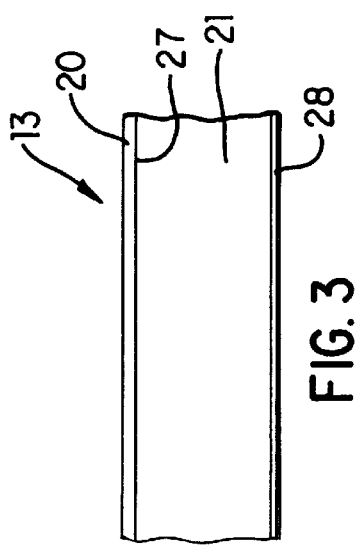
FIG. 3 is a schematic side view of a griddle plate for a cooking apparatus in accordance with one embodiment of this invention.

In accordance with one preferred embodiment of this invention, performance of the griddle plate is enhanced for improved heat transfer by application of fins 30 to the bottom surface of griddle plate 13 facing infrared burner 11 as shown in FIG. 6. In the embodiment shown in FIG. 6, a high emittance surface 28 is applied to both the bottom surface of griddle plate 13 and fins 30.

In order to control the temperature of griddle plate 13, the cooking apparatus of this invention comprises a temperature control sensor element 35, as shown in FIGS. 7 and 8. Given the need for rapid response, temperature control sensing element 35 must be placed in contact with the top stainless steel sheet layer 20. In accordance with one preferred embodiment of this invention, high thermal conductivity material layer 21 forms a transverse temperature control sensor element bore 36 proximate the bottom surface of stainless steel sheet layer 20 into which temperature control sensor element 35 is inserted (FIG. 7). In accordance with an alternative preferred embodiment of this invention, high thermal conductivity material layer 21 forms vertical temperature control sensor element bore 37, as shown in FIG. 8, into which temperature control sensor element 35 is inserted. Location of temperature control sensor element 35 as shown in FIGS. 7 and 8 provides quick response to the change in griddle load, thereby enhancing the quick and uniform response of the cooking apparatus.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An apparatus for cooking food comprising:
a multi-layer cooking plate having a plate thickness in a range of 0.165 to 0.410 inches comprising a stainless steel sheet layer having a top surface and a bottom surface and a metal layer comprising a metal selected from the group consisting of copper, copper alloys, aluminum and aluminum alloys metallurgically bonded to said bottom surface of said stainless steel sheet layer, providing full contact between said bottom surface of said stainless steel sheet layer and said metal layer; and
a fuel-fired burner disposed beneath said multi-layer cooking plate.

2. An apparatus in accordance with claim 1, wherein said stainless steel sheet layer has a layer thickness in a range of about 0.015 to about 0.060 inches.

3. An apparatus in accordance with claim 1, wherein said cooking plate further comprises an additional stainless steel sheet layer metallurgically bonded to an underside of said metal layer.

4. An apparatus in accordance with claim 1, wherein said metal layer is bonded to said stainless steel sheet layer by roll-bonding.

5. An apparatus in accordance with claim 1, wherein said metal layer is bonded to said stainless steel sheet layer by brazing.

6. An apparatus in accordance with claim 1, wherein said metal layer is bonded to said stainless steel sheet layer by soldering.

7. An apparatus in accordance with claim 1, wherein said fuel-fired burner is an infrared burner.

8. An apparatus in accordance with claim 1 further comprising heat input control means for controlling heat input by said fuel-fired burner.

9. An apparatus in accordance with claim 8, wherein said heat input control means comprises temperature means for sensing a temperature of said stainless steel sheet layer.

10. An apparatus in accordance with claim 9, wherein said temperature means comprises a temperature sensing element in contact with said stainless steel sheet layer.

11. An apparatus in accordance with claim 1, wherein a bottom surface of said multi-layer cooking plate is a high emissivity surface.

12. An apparatus in accordance with claim 11, wherein said bottom surface of said multi-layer cooking plate is coated with a high emissivity paint.

13. In a griddle for cooking food comprising a griddle plate and a fuel-fired burner providing heat to an underside of said griddle plate, the improvement comprising:
said griddle plate having a thickness in a range of 0.165 to 0.410 inches comprising a stainless steel sheet top layer having a top surface and a bottom surface and a high thermal conductivity material layer metallurgically bonded to said bottom surface of said stainless steel sheet top layer.

14. A griddle in accordance with claim 13, wherein said stainless steel sheet top layer has a layer thickness in a range of about 0.015 to about 0.060 inches and said high thermal conductivity material layer has a thickness in a range of about 0.150 to about 0.350 inches.

15. A griddle in accordance with claim 13, wherein said high thermal conductivity material layer comprises a metal selected from the group consisting of copper, copper alloys, aluminum, and aluminum alloys.

16. A griddle in accordance with claim 13, wherein said griddle plate further comprises an additional stainless steel sheet layer metallurgically bonded to an underside of said high thermal conductivity material layer.

17. A griddle in accordance with claim 13, wherein said high thermal conductivity material layer is bonded to said stainless steel sheet layer by a process selected from the group consisting of roll-bonding, brazing, and soldering.

18. A griddle in accordance with claim 13, wherein said fuel-fired burner is an infrared burner.

* * * * *